May 30, 1939.   W. H. C. NESS ET AL   2,160,278

PORTABLE EXHAUSTER

Filed Feb. 8, 1937

WM. H. C. NESS and
MARION B. SAWYER,
INVENTORS.

BY
ATTORNEY

Patented May 30, 1939

2,160,278

UNITED STATES PATENT OFFICE 2,160,278

PORTABLE EXHAUSTER

William H. C. Ness and Marion B. Sawyer, Los Angeles, Calif.

Application February 8, 1937, Serial No. 124,602

2 Claims. (Cl. 230—117)

This invention relates to a portable air exhauster of a compact, self-contained construction and capable of being advantageously used in a variety of different situations, as will more fully hereinafter appear.

Among the objects of the invention are; to provide improved means for entraining the air by a motor driven impeller in such a manner that the entrained air will cool the stator housing of the motor before it reaches the impeller driven by such motor; to provide an improved combined impeller housing and motor housing structure; and to furnish improved means to prevent the torsional reaction from a motor-driven impeller from displacing the housing of the motor wherefrom such impeller is being driven.

An important advantage secured by the invention inheres in the fact that so efficient air cooling means are provided to dissipate the heat from the motor that it is possible to use, for example, a one horse power motor at 100% overload, (or slightly over two horse power) under the maximum blower capacity, thereby permitting light weight and portability with a capacity for delivering somewhat over 700 cubic feet of air per minute and over two horse power input.

Among the more important uses for the invention are: to exhaust poisonous welding fumes in naval construction; to exhaust explosive gases from oil tanks, sewer manholes and other situations; to collect dust, and to use in any place where the ordinary blower is used, portability being required.

The invention contemplates in addition to the foregoing objects, the object of obtaining a spiralized entraining of air which may be utilized for cooling purposes and simultaneously with such entrainment handle various kinds of comminuted materials such as sweepings, grain, rubber dust and the like to advantage.

Other objects, advantages and features of invention will hereinafter appear.

Figure 1:
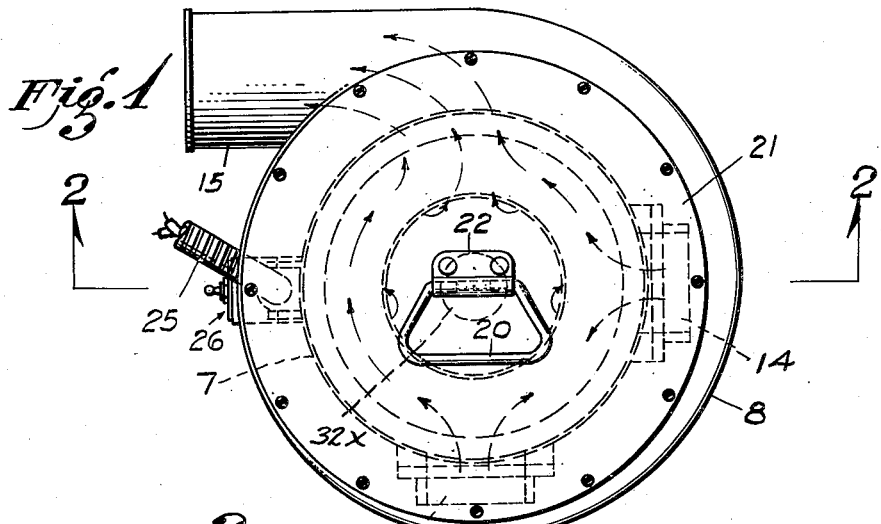

Referring to the accompanying drawing, which illustrates what is at present deemed to be a preferred embodiment of the invention, Fig. 1 is a plan view of the device.

Figure 2:
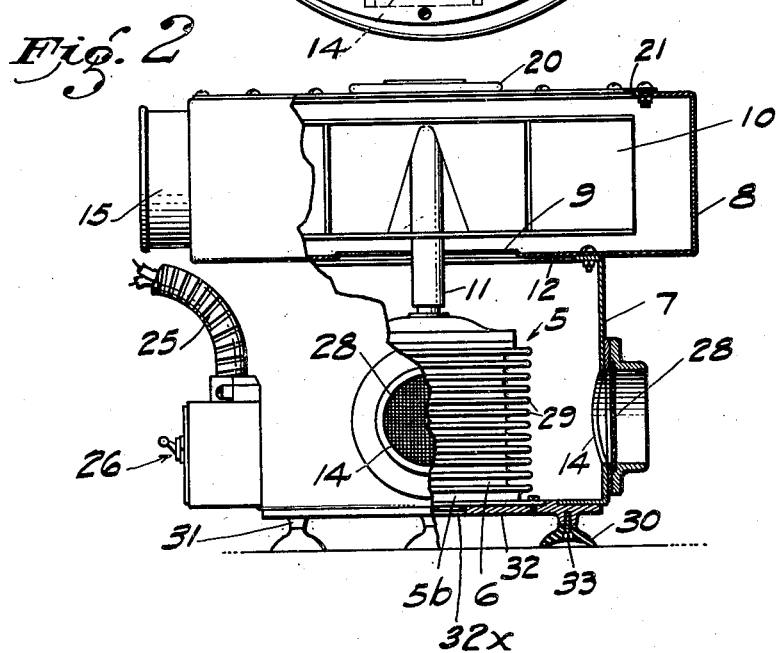

Fig. 2 is a view partly in side elevation and partly in vertical mid-section, the plane of section for the sectioned part of the device being on line 2—2 of Fig. 1.

Referring in detail to the drawing, the main parts of the structure shown are the motor 5, a stator housing 6, a motor housing 7 surrounding said stator housing in an outwardly spaced relation thereto, the impeller housing 8 which surmounts said motor housing and communicates therewith through an opening 9, the impeller 10 with said impeller housing and the motor shaft 11 whereby said impeller is driven by said motor.

Aside from the covering afforded by the lower wall 12 of the impeller housing 8, the drum-shaped housing 7 is of an open-topped character, thus simplifying the structure and economizing material in the manufacture thereof. The opening 9 through the wall 12 is of a large circular sort and the motor shaft 11 extends centrally therethrough. Owing to this arrangement of the opening 9 and shaft 11 and due to the fact that the drum shaped housing 7 is furnished with peripheral air intake openings 14, the air entrained into the housing 7 is given a whirling movement around the stator housing 6 as it passes through said motor housing, thus producing a more pronounced cooling effect upon the motor and its stator housing. This will be all the more evident when it is noted that the lower side of the impeller 10 is adjacent to and concentric with the spacious circular air opening 9. The impeller housing 8 is furnished with one or more tubular air delivery extensions 15, which lead tangentially from the fan casing and are adapted to be connected with any desired conduit means for the air delivered from the impeller housing.

As illustrated in Fig. 1 the impeller is assumed to be rotating in the anti-clockwise direction and the arrows shown in this view indicate the direction of the air currents which will result.

The drum-shaped impeller housing 8 is shown having a lifting handle 20 secured centrally to its upper side wall 21 by means of a clip 22 which is riveted or otherwise secured to the impeller housing.

The whole device is intended to be made sufficiently light and portable to be carried by the handle 20 to the desired place of use.

The motor is supplied with electric current through the cable 25, the current being controlled by a vapor proof switch 26.

Each of the openings or intake parts 14 of the housing 7 includes a screen 28.

The stator housing is ribbed in concentric circles as shown at 29 and is placed in such a position that practically all of the incoming air is forced over it. The ribs 29 are cylindrically arranged throughout a space which is concentrically positioned in relation to the incoming currents of air, therefore, said air currents pass effectively between said ribs and keep them clean, while also causing the maximum amount of heat radiation to take place throughout the ribbed surface. This extreme ventilation of the motor housing, in conjunction with the other heat-dissipating features provided by the invention, makes it possible to use a completely inclosed vapor proof non-ventilated motor, thereby permitting gas, fumes, dust, dirt, etc., to be handled by the motor itself, passing them over the motor without permitting to come into contact with its windings, rotor stator air gap, bearings, or any exposed electrical conductor. By placing the motor in the direct air intake, it is possible not alone to develop twice the H. P. for the same size of the ordinary inclosed breather type motor, but also to utilize the totally inclosed type of motor which ordinarily is twice the size and weight per H. P. of the common or breather type motor.

With a construction built according to the principles of this invention it is possible to construct a motor-driven blower weighing only 53 pounds that will do as much work as blowers for the same purposes which ordinarily weigh from 200 to 300 pounds.

The motor housing 7 is supported by concavo-convex suction feet 30 which are shown secured to lugs 31 depending from housing floor 32, which is preferably made of aluminum to secure lightness and a good heat conduction in order to dissipate heat rapidly from the lower portion of the motor. This effect is enhanced by machining smooth the lower motor end bell 5b and bolting it to said aluminum floor as shown in Fig. 2, thus providing closely contacting extensive flat surfaces through which the heat rapidly passes. These lugs and feet have flat shoulders which abut as shown when the feet are secured in place by the screw bolts 33.

The floor 32 is furnished centrally with a good sized opening 32X which exposes directly to the outside air a considerable portion of the bottom surface of the bell 5b. This construction aids materially in facilitating manufacture and dissipating the heat from said bell.

Owing to the concave character of the circular rubber feet 30 they utilize air suction upon the surface which supports the device and thus safeguard against the motor "stepping" the device away from the desired position during use, as might otherwise result from the tortional reaction of the fan when rotating at a high speed or during test periods the device is subjected to incident to its packing for shipment where the feet perform the advantage of cushions when the devices are packed one on the other.

It is considered within the province of this invention to pitch the ribs 29 and thus spiralize the entrained air thus aiding in keeping stator housing clean, and in handling air combined with substances such as sweepings, grain, rubber, dust and the like around the motor, or reverse the arrangement by providing the vanes on the inside of the housing 7 or to do both.

It should be understood that the present disclosure is for the purpose of illustration only and that this invention includes all modifications and equivalents which fall within the scope of the subject matter claimed.

What is claimed is:

1. In a portable exhauster, a housing having an aluminum floor, a totally enclosed motor mounted upon said floor, said motor having a machined lower end bell which engages said floor in an abutting relation, said housing having an extensive opening in its floor over which said motor is mounted with its lower end bell exposed and directed to an air space below said floor.

2. In a portable exhauster, a motor provided with one end bell machined flat, said motor having a vertically disposed shaft and said motor being positioned with said bell in the lower-most position, a stator cooling housing totally inclosing said motor, an aluminum floor having an opening upon which the smoothly machined end bell of said motor and said cooling housing is mounted in an abutting relation, with extensive flat faces directly contacting each other and with the lower face of said end bell exposed and directed to an air space below said floor, a drum shaped housing in an outwardly spaced relation to said stator cooling housing and provided with an air delivery opening through which said shaft extends, said aluminum floor forming a base part of said outwardly spaced drum shaped housing, said drum shaped housing having a plurality of air intakes in its peripheral portion to deliver entrained air radially to the outer surface of said stator cooling housing, a drum shaped impeller housing detachably mounted atop the housing which incloses said stator cooling housing, said drum shaped impeller housing having an opening in registry with said air delivery opening and having a tangential opening in its periphery for connecting a conduit thereto, and an impeller within said impeller housing close to said registering openings and disposed axially in relation thereto to draw air therethrough, said impeller being mounted upon said vertically extending shaft and driven by said motor.

WILLIAM H. C. NESS.
MARION B. SAWYER.